US007224417B2

(12) United States Patent  
Angele et al.

(10) Patent No.: US 7,224,417 B2  
(45) Date of Patent: May 29, 2007

(54) NEMATIC LIQUID CRYSTAL BISTABLE DISPLAY DEVICE WITH GREY LEVEL

(75) Inventors: Jacques Angele, Malakoff (FR); Philippe Martinot-Lagarde, Marcoussis (FR); Ivan Dozov, Gif sur Yvette (FR); Daniel Stoenescu, Orsay (FR); Romain Vercelletto, Poissy (FR)

(73) Assignee: Nemoptic, Magny-les-Hameaux ( * ) Notice: Subject to any disclaimer, the term of this patent is extended or adjusted under 35 U.S.C. 154(b) by 7 days.

(21) Appl. No.: 10/476,863

(22) PCT Filed: May 2, 2002

(86) PCT No.: PCT/FR02/01514

§ 371 (c)(1),  
(2), (4) Date: Nov. 3, 2003

(87) PCT Pub. No.: WO02/091073

PCT Pub. Date: Nov. 14, 2002

(65) Prior Publication Data

US 2004/0125294 A1    Jul. 1, 2004

(30) Foreign Application Priority Data

May 4, 2001    (FR) .................................. 01/06045

(51) Int. Cl.  
*G02F 1/1333* (2006.01)  
*G02F 1/133* (2006.01)  
*C09K 19/02* (2006.01)

(52) U.S. Cl. .......................... 349/85; 349/33; 349/177
(58) Field of Classification Search ................. 349/85, 349/129, 177  
See application file for complete search history.

(56) References Cited

U.S. PATENT DOCUMENTS

| 4,601,542 | A |   | 7/1986  | Meyer |
| 5,408,345 | A | * | 4/1995  | Mitsui et al. ................. 349/42 |
| 5,995,173 | A | * | 11/1999 | Barberi et al. ................ 349/33 |
| 6,327,017 | B2 | * | 12/2001 | Barberi et al. ............. 349/177 |
| 6,903,790 | B2 | * | 6/2005  | Kitson et al. ............... 349/123 |

FOREIGN PATENT DOCUMENTS

| EP | 0773468 | 5/1997  |
| EP | 1094103 | 4/2001  |
| EP | 1139151 | 10/2001 |

OTHER PUBLICATIONS

"Flow induced surface switching ina bistable nematic device", Mcintosh, et al., Journal of Engineering Mathematics, Feb. 2000, Kluwer Academic Publishers, Netherlands, vol. 37, No. 1-3, pp. 129-142.

(Continued)

*Primary Examiner*—Andrew Schechter  
*Assistant Examiner*—Michael H. Caley  
(74) *Attorney, Agent, or Firm*—Blakely Sokoloff Taylor & Zafman

(57) ABSTRACT

The present invention relates to a nematic bistable display device, characterized in that it comprises control means (40) for producing, after the anchoring is broken, hybrid textures in which two bistable textures coexist in a controlled proportion within the same pixel, these being separated by 180° volume disclination lines or by 180° reorientation walls on one of the surfaces, and means (40) for the long-term stabilization of the hybrid textures by transformation of the volume lines into surface walls and the immobilization of these walls on the surface.

22 Claims, 8 Drawing Sheets

OTHER PUBLICATIONS

"Surface Pretilt Effect of Bistable Twisted Nematic Liquid Crystal Display", Yoo, et al., Japanese Journal of Applied Physics, vol. 38, No. 10, part 1 Oct. 1999, pp. 6005-6007.

"Surface Walls on a Bistable Anchoring of Nematic Liquid Crystals", Nobili, et al., vol. 5, No. 4, Apr. 1, 1995, pp. 531-560.

Random domain formation in 0-360 bistable nematic twist cells, h. bock., Applied Physics Letters, American Institute of Physics, New York, US, vol. 73, No. 20, Nov. 16, 1998.

* cited by examiner

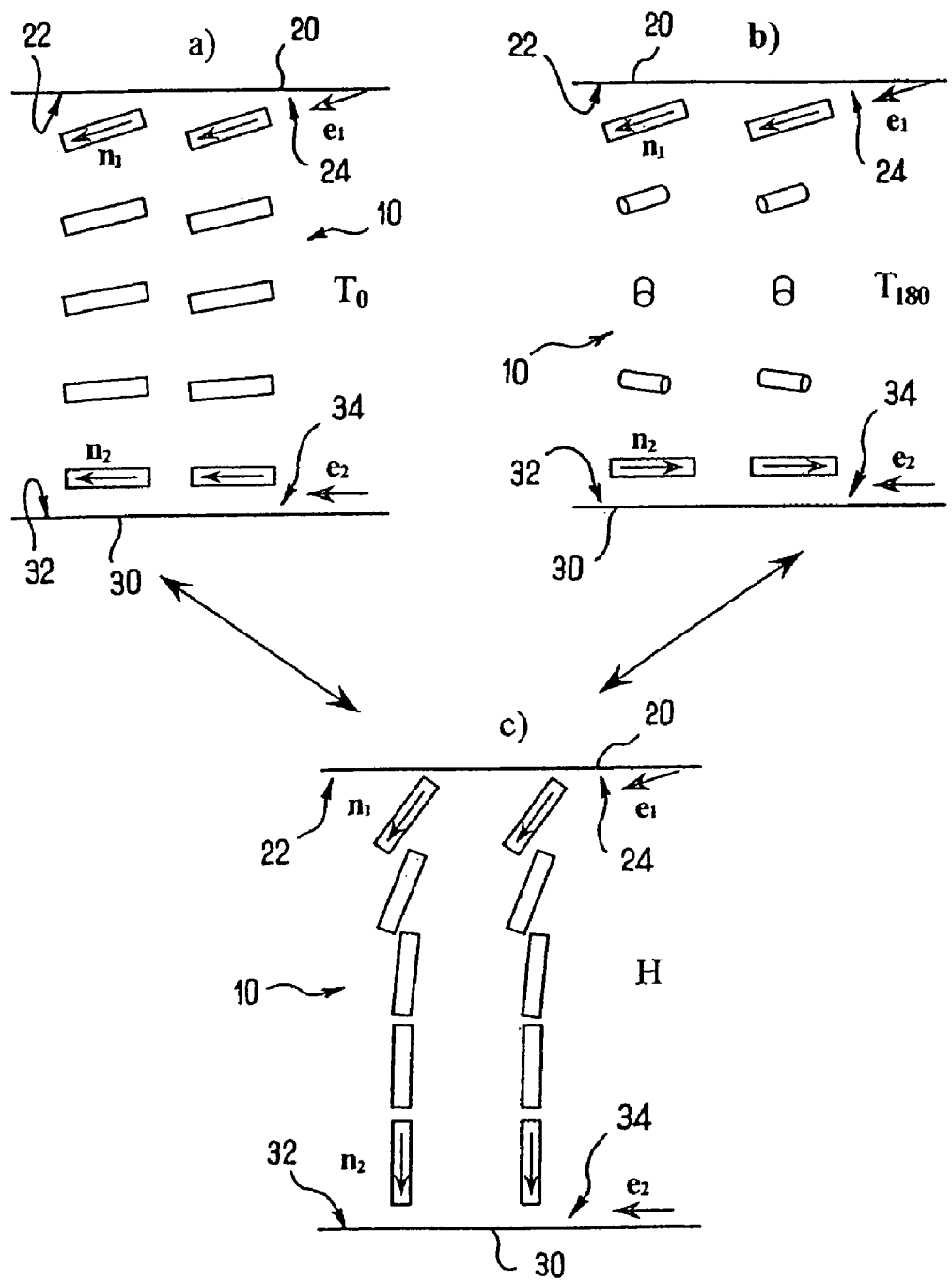
FIG_1
PRIOR ART

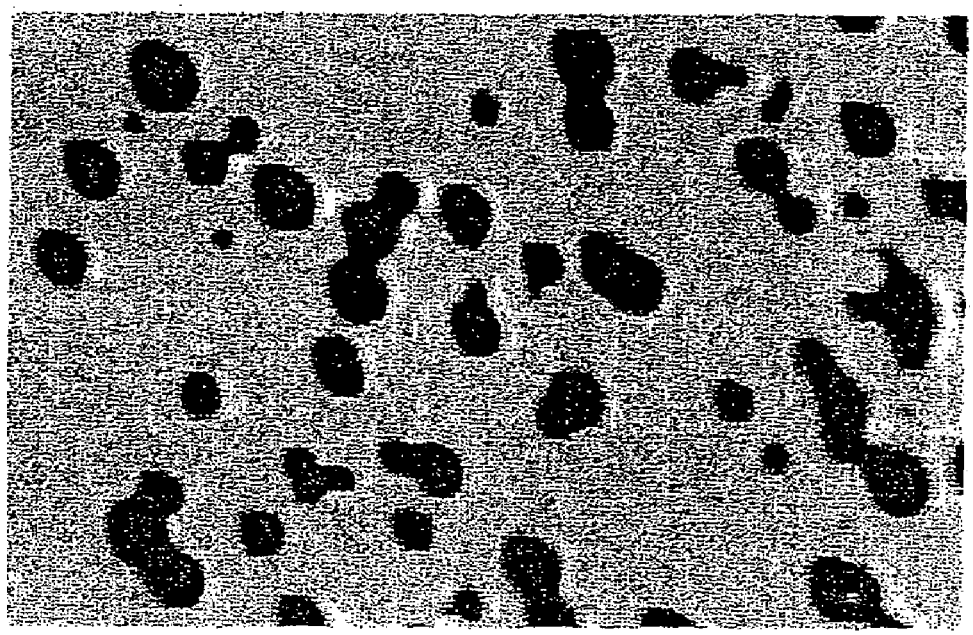
FIG_2

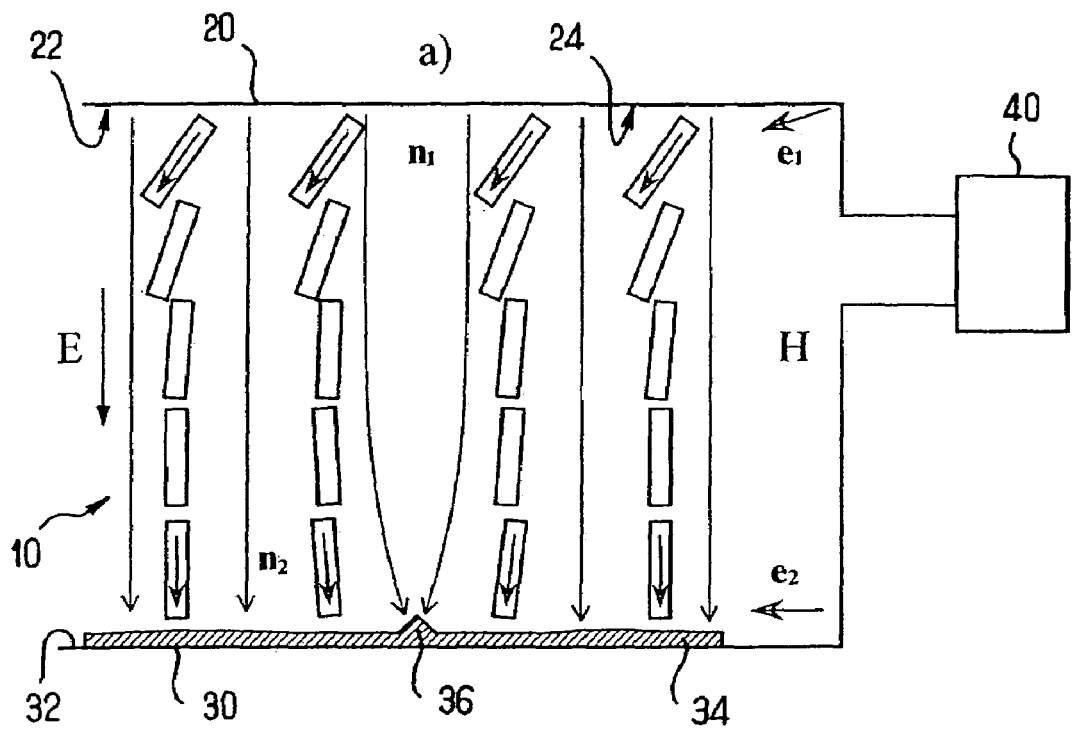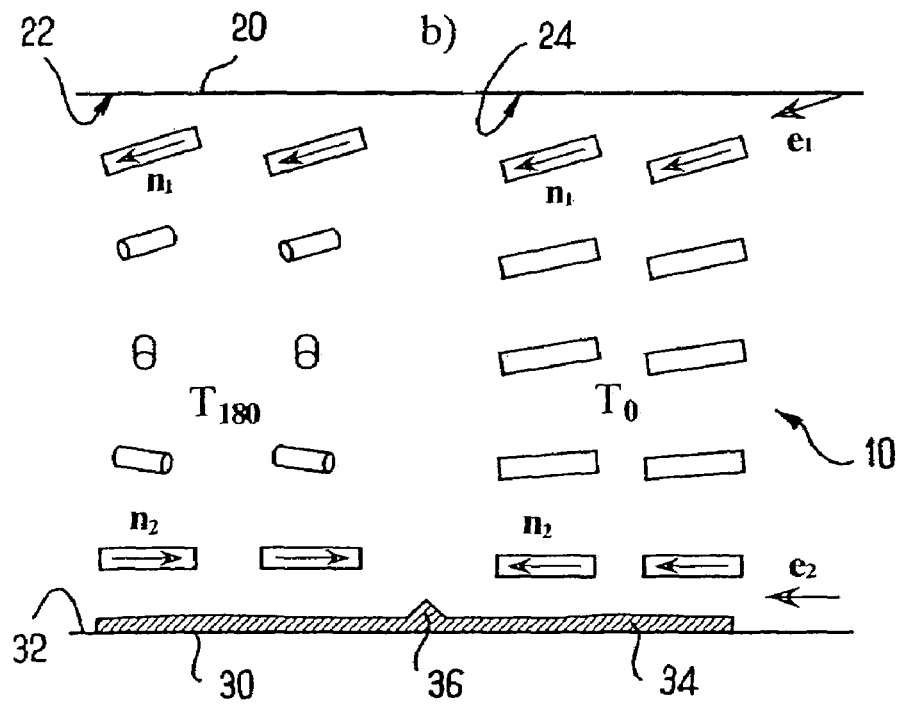
FIG_3

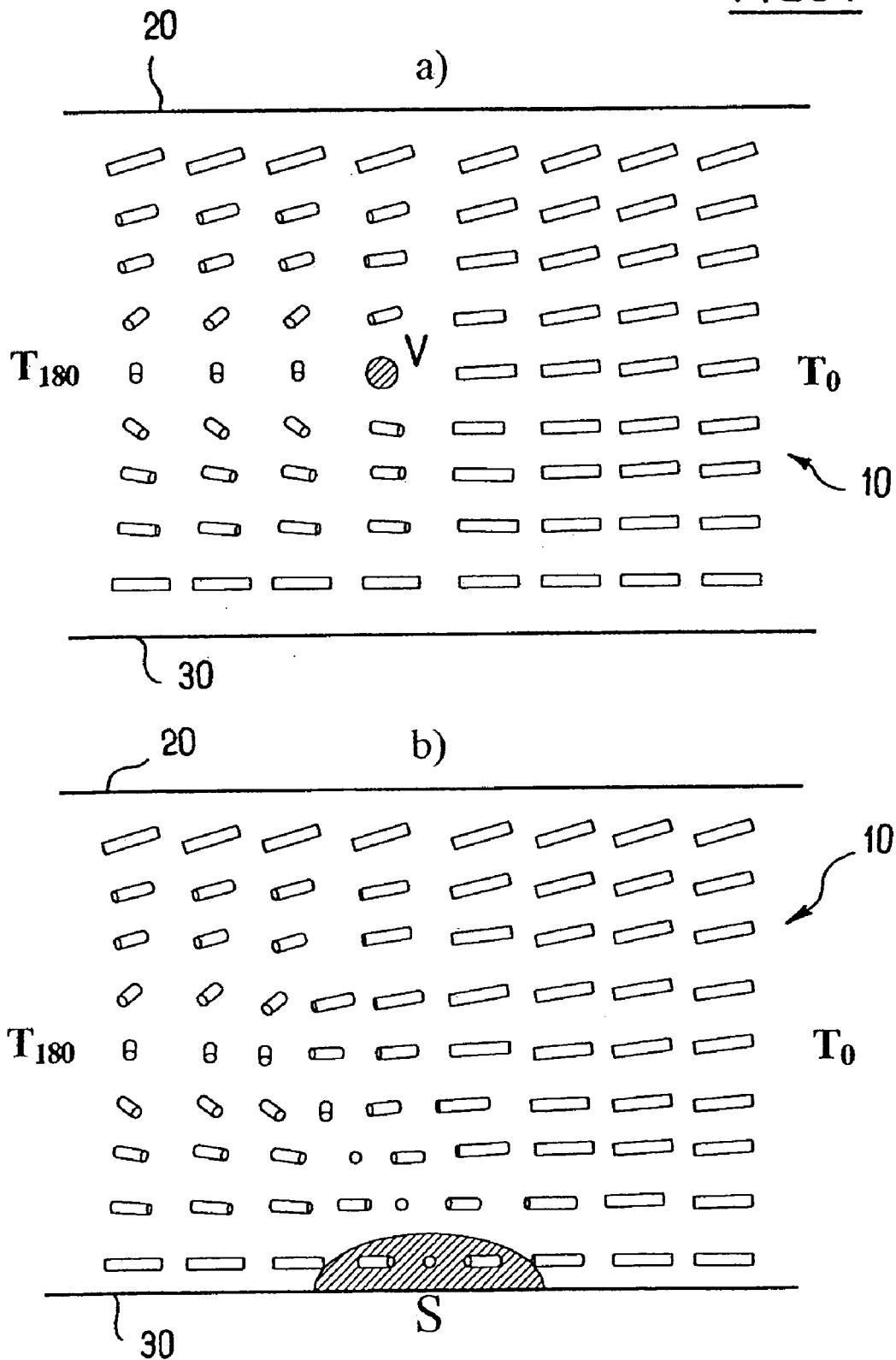

FIG_7
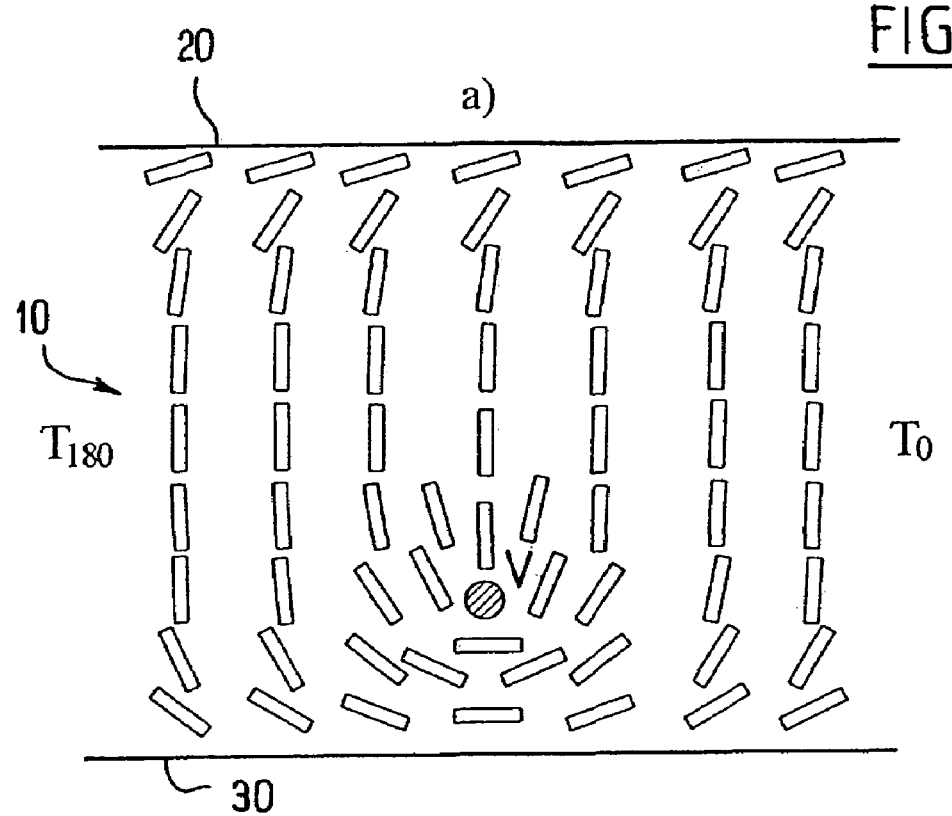
a)
$T_{180}$  $T_0$
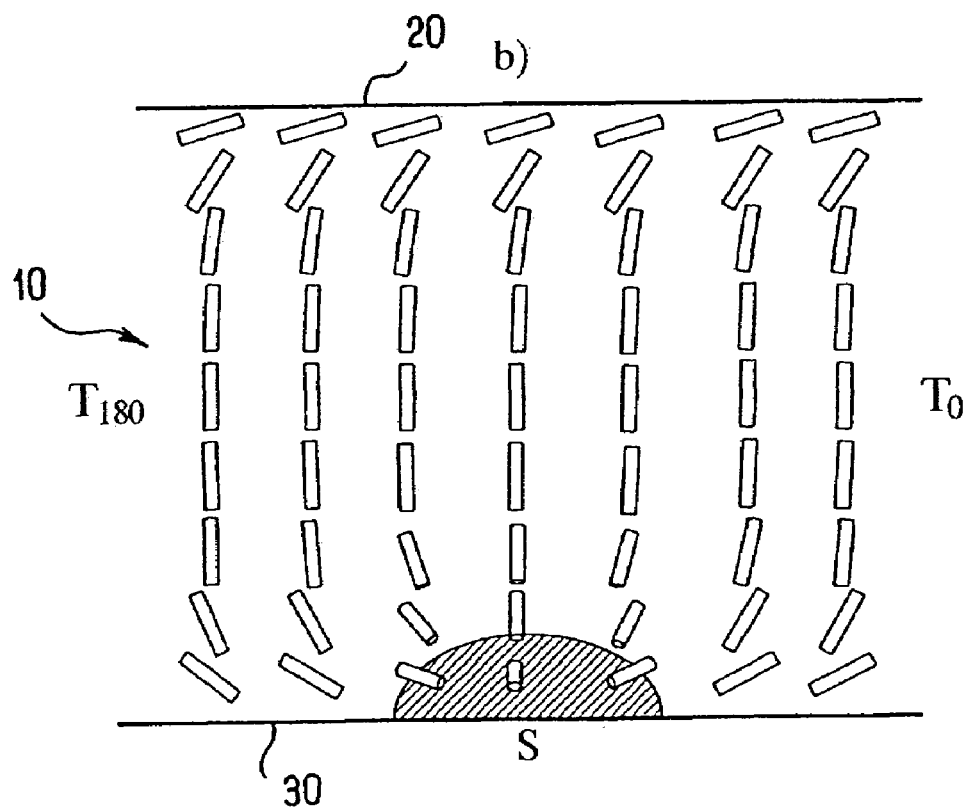
b)
$T_{180}$  $T_0$

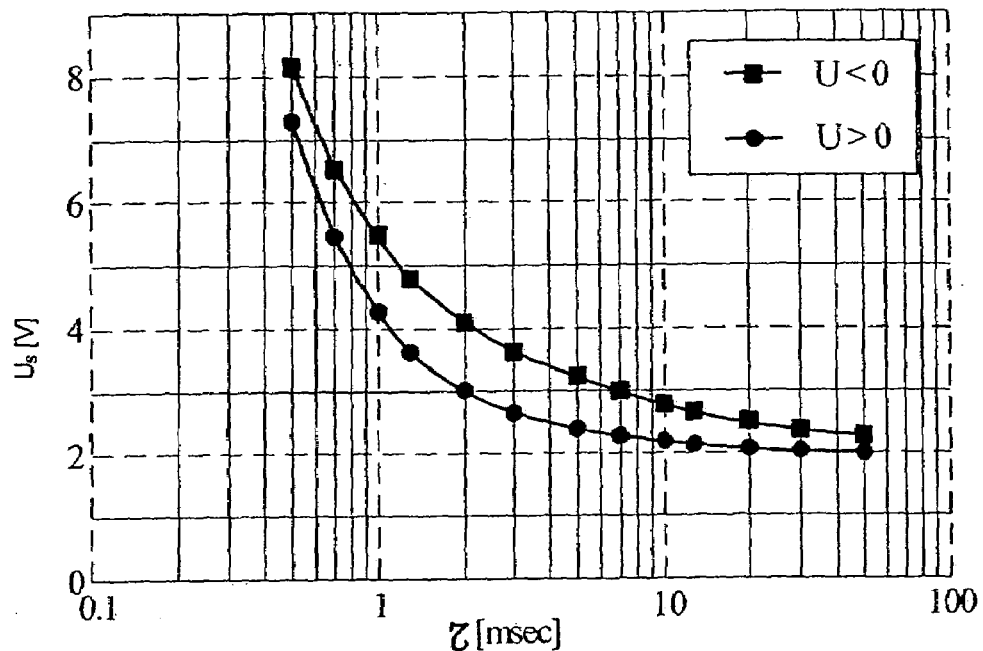
FIG_8
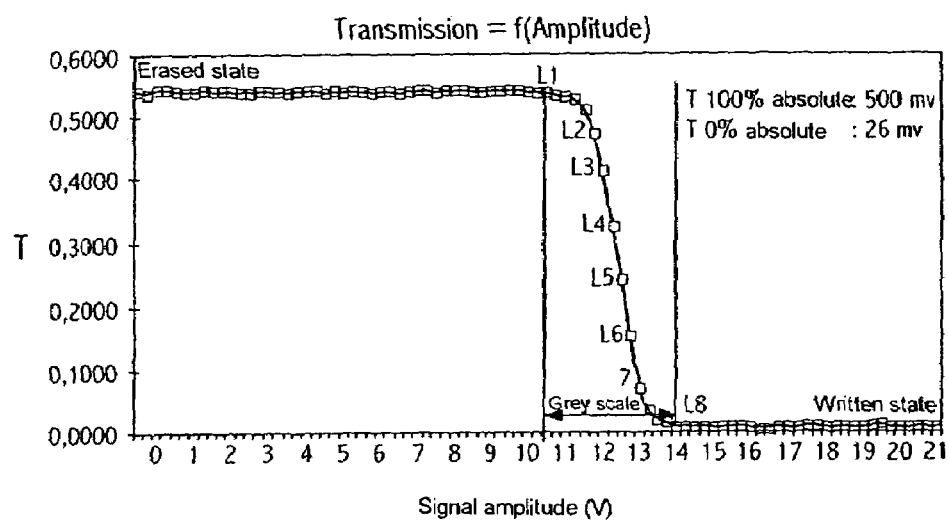
FIG_9

NEMATIC LIQUID CRYSTAL BISTABLE DISPLAY DEVICE WITH GREY LEVEL

The present patent application is a non-provisional application of International Application No. PCT/FR02/01514, filed May 2, 2002.

The present invention relates to the field of display devices based on liquid crystals.

Liquid crystals are widely used in a large number of display devices, such as alphanumeric displays, flat screens, optical valves, etc.

In general, a liquid-crystal-based display device comprises two parallel plates or substrates which ensure that the liquid crystal is confined. These plates or substrates are provided, on the one hand, with means for controlling the orientation and the anchoring of the liquid crystal and, on the other hand, electrodes for applying an electric field to the liquid crystal in order to modify the configuration thereof.

In devices based on nematic liquid crystals, which form the subject of the present invention, a nematic liquid crystal is used, this being achiral or chiralized, for example, by adding a chiral dopant, with a helix pitch of greater than a few micrometers. The orientation and the anchoring of the liquid crystal near the surfaces are defined by alignment layers or treatments applied to the substrates, which, in the absence of an electric field, impose a uniform or slightly twisted texture.

Most of the devices proposed and produced hitherto are monostable. In the absence of an electric field, only a single texture is produced in the device. This texture corresponds to an absolute minimum of the total energy of the cell. In an electric field, this texture is continuously deformed and its optical properties vary depending on the applied voltage. On cutting off the field, the nematic returns again to the single monostable texture.

Another class of nematic displays is that of bistable nematics. In this case, at least two distinct textures may be produced in the cell. These textures correspond to the same surface anchoring states and are stable or metastable in the absence of an electric field. The switching between the two states is carried out by applying appropriate electrical signals. However, once the image has been written, it remains stored in the absence of a field thanks to the bistability (or metastability). This memory of bistable displays is very attractive for many applications. It allows a low image refresh rate. It thus makes it possible, for example, to decrease the consumption of portable appliances.

A typical example of a bistable display is shown schematically in FIG. 1. A description of this device will be found in documents [1] and [2]. The two bistable textures $T_0$ and $T_{180}$, shown in FIGS. 1a and 1b respectively, differ from each other by a twist of ±180° and are topologically incompatible. The spontaneous pitch of the nematic is chosen to be approximately equal to one quarter of the thickness of the cell in order to make the $T_0$ and $T_{180}$ energies essentially equal. Without a field, no other state with a lower energy exists: $T_0$ and $T_{180}$ exhibit true bistability. Under a strong electric field, an almost homeotropic texture H (FIG. 1C) is obtained, with at least one of the anchoring points on the substrates (broken): the molecules are normal to the plate or substrate near its surface. On cutting off the electric field, the cell is guided towards one or other of the bistable states, favouring elastic coupling ($T_0$) or hydrodynamic coupling ($T_{180}$) between the two surface anchoring points. Optically, the two states $T_0$ and $T_{180}$ are very different and make it possible to display black and white images with a contrast of greater than 100.

Another class of memory liquid-crystal devices are displays of the order-disorder type. This devices have a uniform or regular texture, and a large number of disordered textures, with a high defect density. Such devices are mentioned in documents [3] and [4]. In these devices, the light is strongly scattered and de-polarized on the defects. The optical properties of the disordered textures change proportionally to the defect density, thereby allowing grey scales to be displayed, this being indispensable for obtaining high-quality images in black, grey and white or in colour.

However, the bistable devices proper, with only two equal-energy states of regular textures, are intrinsically poorly suited for a display having grey tones. This is because in these devices only two distinct bistable textures can be displayed and kept in each of the pixels of the image.

Various approaches have been proposed in order to try to make bistable devices compatible with a grey-scale display.

For high-speed displays (for example video screens), it is possible to obtain grey scales by digitization of the image and temporal cutting of the video frame into several sub-frames with durations in ratios of 1:2:4, etc. In each sub-frame, the state of the pixel varies in order to ensure on average the digital level of desired intensity. This approach, suitable only for ultrafast devices (for example ferroelectric liquid-crystal displays), has many difficulties. It requires complicated drivers (frame memory requirement). In addition the multiplexing is difficult (requiring very short sub-frames to be produced). Finally, this approach sacrifices the bistability. This is because the grey scales are not actual states of the pixel but a temporal average of the bistable states and, when image refreshing is cut, the image stops. It displays the last state of the pixels. This is a black-and-white image.

Another approach consists in spatially subdividing each of the pixels—the digitized image is displayed as a spatial average of the black-and-white states produced in the sub-pixels. The bistability of the image is preserved, but the device is complicated (very small sub-pixel dimensions, considerable increase in the number of sub-pixels to be addressed for the same spatial resolution, difficulties in multiplexing).

The objective of the present invention is to provide novel means for producing a liquid-crystal-based display suitable for allowing grey scales to be obtained.

This objective is achieved within the context of the present invention by means of a nematic bistable display device comprising:

a nematic liquid-crystal layer placed between two substrates provided with electrodes and with alignment means which ensure monostable surface anchoring states of the liquid crystal, the symmetry and the force of at least one of the anchoring states allowing the anchoring to be broken in an electric field perpendicular to the substrates;

means for applying an electric field to the liquid crystal, between the two substrates, and for breaking the anchoring to at least one of the surfaces, with a transient passage of the surface director parallel to the field and relaxation after the field has been cut off towards one or other of two bistable or metastable textures, which differ from each other by a 180° twist and are both compatible with monostable anchoring states;

characterized in that it furthermore includes:

control means for producing, after the anchoring has been broken, hybrid textures in which the said bistable textures coexist in a controlled proportion in the same pixel, the said textures being separated by 180° disclination lines in the volume or by 180° reorientation walls on one of the surfaces; and means for long-term stabilization of the hybrid textures by transformation of the volume lines into surface walls and immobilization of these walls on the surface.

Within the context of the present invention, the liquid crystal used may be doped in order to become chiral and may correspond to a cholesteric.

The present invention also relates to a display method employing a nematic bistable display device comprising:

a nematic liquid crystal layer placed between two substrates provided with electrodes and with alignment means which ensure monostable surface anchoring states of the liquid crystal, the symmetry and the force of at least one of the anchoring states allowing the anchoring to be broken in an electric field perpendicular to the substrates; and means for applying an electric field to the liquid crystal, between the two substrates, and for breaking the anchoring on at least one of the surfaces, with a transient passage of the surface director parallel to the field and relaxation after the field has been broken towards one or other of two bistable or metastable textures, which differ from each other by a 180° twist and are both compatible with monostable anchoring states;

characterized in that the method comprises the steps consisting in:

producing, after the anchoring has been broken, hybrid textures in which the said bistable textures coexist in a controlled proportion within the same pixel, the said textures being separated by 180° disclination lines in the volume or by 180° reorientation walls on one of the surfaces; and stabilizing the hybrid textures long term by transformation of the volume lines into surface walls and immobilization of these walls on the surface.

Further features, objectives and advantages of the present invention will become apparent on reading the detailed description which follows, in conjunction with the appended drawings, these being given by way of non-limiting examples and in which:

FIG. 1 shows schematically a bistable liquid-crystal display cell according to the prior art, FIGS. 1a and 1b illustrating two stable states of the cell and FIG. 1c illustrating a transient state in an electric field;

FIG. 2 shows a photograph of a pixel of a liquid-crystal display cell according to the present invention;

FIG. 3 shows the architecture according to the present invention resulting from a surface defect on a confinement plate, FIG. 3a showing the cell in an electric field and FIG. 3b showing the cell after the electric field has been cut off;

FIGS. 4a and 4b illustrate two types of defect lines capable of existing in a display device according to the present invention;

FIGS. 7a and 7b show schematically the variation from a volume disclination line to a surface wall;

FIG. 8 shows, for two polarities, the amplitude of a "sticking" voltage capable of transforming volume disclination lines into surface walls;

FIG. 9 shows the optical transmission of a cell provided with two polarizers, as a function of the amplitude of fixed-duration switching pulses.

Figure 5:
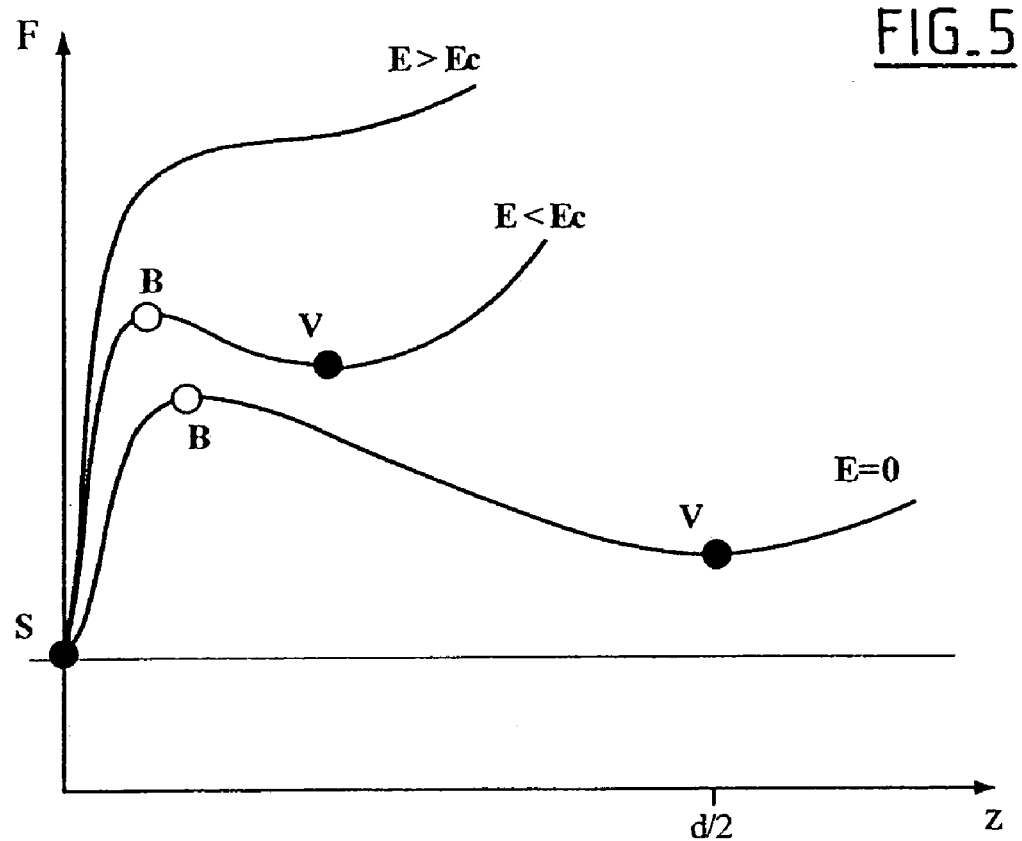
FIG. 5 shows schematically the energy of a volume defect line V as a function of its distance z from the surface.

The typical architecture of a bistable nematic pixel, switched by breaking the anchoring, is shown schematically in FIG. 1. A thin layer of nematic liquid crystal 10, having a thickness d<5 µm, preferably d<2 µm, is contained between two substrates 20, 30 (made of glass, plastic, etc.). Such substrates 20, 30 are also called plates. Two electrodes 22, 32, at least one of which is transparent, are deposited respectively on the inner face of the substrates 20, 30, in order to allow an electric field perpendicular to the substrates 20, 30 to be applied to the liquid crystal. Alignment layers 24 and 34 define monostable anchoring states on the substrates 20, 30: in the absence of a field, a single orientation of the nematic director n is imposed on each surface by the alignment layer 24, 34. This direction is also called the easy axis e.

On the plate 20 (master plate), the alignment is planar or oblique, with a high zenithal anchoring energy: during switching, in a high electric field, the orientation of the surface director $n_1$ remains close to the easy axis $e_1$ and after the field has been cut off $n_1$ again becomes parallel to $e_1$.

On the plate 30 (slave plate), the orientation is planar (easy axis $e_2$ parallel to the plane of the cell) and the zenithal anchoring is weak or moderate. In a high electric field, the anchoring to this plate breaks (FIG. 1c): the surface director $n_2$ orients parallel to the field and perpendicular to $e_2$. This orientation corresponds to the maximum anchoring energy and to a zero anchoring torque. After the electric field has been cut off, the director $n_2$ is in unstable equilibrium (absence of torque) and may return to equilibrium in two different ways: with $n_2$ parallel ($T_0$, FIG. 1a) or antiparallel ($T_{180}$, FIG. 1b) to $e_2$. This is because these two states are also compatible with the monostable anchoring state (the nematic is a system of the quadripolar kind and the $n_2$ and $-n_2$ states are equivalent). In this way, after switching by breaking the anchoring, one or other of the textures ($T_0$ or $T_{180}$) is produced.

The choice of the final texture is made by weak coupling between the two anchoring states, transmitted by the nematic 10, which disturb the unstable equilibrium of the slave plate 30 upon cutting off the field. A sudden cut-off favours hydrodynamic coupling (volume and surface backflow effect) and produces the twisted texture $T_{180}$. A gradual cut-off favours static coupling (by bending elasticity) and imposes the quasi-uniform final state $T_0$.

The two textures $T_0$ and $T_{180}$ are topologically distinct: a continuous transition between them is impossible as this requires breaking either the anchoring or the nematic order. For an achiral nematic, the $T_{180}$ texture is metastable. That is to say it has a higher energy than $T_0$, but a high energy barrier prevents it from spontaneously transforming into $T_0$ in the absence of a field. Long-term, $T_{180}$ may nevertheless transform to $T_0$ by nucleation and propagation of defects (180° disclination lines). This spurious switching may be prevented by chiralizing the nematic with chiral dopants having a pitch P close to P=4d. In this way the energies of the two textures become equal and true bistability is achieved: a bistable nematic display is obtained which operates in black and white or more precisely in "on/off" mode.

The grey scale display device according to the present invention has the same basic structure illustrated in FIG. 1 and described previously.

This is because, in FIG. 3 et seq., which illustrate cells according to the present invention, there are again two plates 20, 30 provided with electrodes 22, 32 and with alignment layers 24 and 34, in accordance with the arrangements described above. FIG. 3 also shows, schematically illustrated, means 40 connected to the electrodes 22, 32, these being suitable for applying between the electrodes, and therefore on the liquid-crystal material 10, electrical drive pulses of controlled amplitude and controlled duration.

The inventors have in fact demonstrated that in this type of device, it is possible to produce and stabilize controllable intermediate analogue grey states in order to obtain a bistable display with grey tones. These states correspond to "hybrid" textures, that is to say the two bistable textures coexist in the same pixel (FIG. 2). The hybrid state is therefore a random mixture of two types of domain—"written" domains (black texture $T_{180}$ between crossed polarizers) and "erased" domains (diagonally oriented white texture $T_0$ between crossed polarizers). Locally, a single state is produced in each of the domains, which is uniform over the entire area of the domain. The area of the domains is of the order of $100 \times d^2$, small compared with the total area of the pixel, and a large number of microdomains are produced within the same pixel, making it possible to produce a large number of grey levels by varying their average density. The transmitted or reflected intensity of the pixel is therefore a weighted average of the intensities of the two types of domain and may vary continuously between 0% (black state) and 100% (white state).

The origin of the hybrid states is the unstable equilibrium of the surface director after the anchoring at the slave plate 30 has been broken. In this state, the slightest disturbance is sufficient to induce a rapid relaxation of the nematic surface director $n_2$ towards one or other of the two positions parallel or antiparallel to $e_2$ (FIG. 1) and therefore towards the final texture $T_0$ or $T_{180}$. If the voltage of the drive pulse greatly exceeds the threshold for breaking the anchoring, the static and dynamic coupling between the two surfaces are strong and the entire pixel will switch towards a single uniform texture (white state or black state). On the other hand, close to the breaking threshold, the coupling is weak and local perturbations (these may be considered as local "noise" which is superimposed on the drive signal) are sufficient to induce the hybrid states.

The inventors have determined that local perturbations may be created by controlling the dispersion in the surface anchoring force. This is because the local surface anchoring energy may vary within certain limits which depend on the nature and the uniformity of the alignment layers. In this way, a uniform drive field may or may not locally exceed the anchoring breaking threshold. It will induce hybrid final textures, the grey level of which depends on the voltage of the pulses.

The inventors have also demonstrated that the local perturbations may be created by the topography of the surface, for example a variable thickness of the alignment layer. This topography may be periodic (one-dimensional or two-dimensional surface grating) or random, for example a microstructured surface. In these cases, the voltage for breaking the anchoring varies with the local thickness of the liquid-crystal film since the field is no longer uniform. It is screened to a greater or lesser extent by the dielectric properties of the anchoring layer.

The inventors have also determined that hybrid textures may be obtained by applying slightly non-uniform electric fields to a pixel using, for example, electrodes the resistance or surface finish of which is not uniform. This gives a field whose surface intensity or whose orientation varies (slightly oblique field). This disturbs to a greater or lesser extent the breaking of the anchoring.

FIG. 3 shows schematically the inhomogeneous electric field created around an irregularity 36 in the surface of the electrode 32 on the slave plate 30 and the induced perturbations in the texture in a field (FIG. 3a). After relaxation on cutting off the field (FIG. 3b), a hybrid texture is obtained, with the two bistable textures induced on each side of the surface irregularity.

One means according to the present invention of producing the hybrid textures is to cause, during the drive pulse, transient texture instabilities which are hydrodynamic or flexoelectric in origin or are due to the intrinsic polarity of the surface. All these instabilities, of dynamic or static origin, lead to periodic deviations in the nematic director with respect to its equilibrium state in the volume and at the surface, with a period comparable to the thickness of the cell. In a strong field, the amplitude of these instabilities is very small but when the field is close to the breaking threshold they may be sufficient to induce hybrid textures.

Another means, according to the present invention, allowing hybrid textures to be produced is associated with the transient shear flows of the liquid crystal during application of the field (backflow effect) on the surface and in the volume, which flows also disturb the orientation of the director. On inhomogeneous or rough surfaces, these flows cause slight transient inhomogeneities in the orientation of the surface director. Cut-off of the field after the anchoring has been broken, but before complete relaxation of the flows, therefore also induces once again a hybrid pixel texture.

However, the inventors have found that, once the hybrid textures have been created, they may vary over time and relax towards black or white uniform states by propagation of the lines of defects which separate the domains corresponding to the two main bistable textures.

More specifically, they have found that, in the geometry of the display which forms the subject of the present invention, two types of lines of defects may exist, with different structures and mobilities.

A first type of line of defects is illustrated in FIG. 4a. These are 180° disclination lines. These defect lines (shown schematically in the form of the region V in FIG. 4a) have a molten, isotropic or biaxial core. At this point the nematic order parameter becomes zero or even changes sign. In equilibrium, these lines lie in the mid-plane of the cell and form closed loops which surround the domains making up the hybrid texture. These lines are highly mobile and can move with viscous rubbing in the plane of the device owing to the action of the elastic forces or of the flows. If the distortion energy per unit area of two bistable textures is different (for example achiral or cholesteric nematic with a pitch poorly matched to the thickness of the cell), an elastic force acts on the line and displaces it. Locally, after the line has passed, the higher-energy texture (metastable texture) is replaced with the other texture. The area occupied by the metastable texture gradually decreases and long-term the entire pixel becomes uniform in the stable state (white or black). Even for bistable textures with the same energy (in the case of a cholesteric well matched to the thickness of the cell), the tension in the defect line (energy per unit length)

makes the disclination loops shrink and disappear long term, causing a slow change in the grey scale towards 0% or 100%.

Another possible structure of the lines of defects is shown schematically in FIG. 4b. In this case, they are 180° surface director reorientation walls (the region S in FIG. 4b) which separate the regions in which the two bistable textures exist. Across the wall, the surface director gradually rotates through 180°. These lines, localized on the surface, are much less mobile than the volume lines because of their higher effective viscosity and, above all, a "strong" friction due to the attachment of the line to the surface irregularities and/or to the local memory of the anchoring. Due to the strong friction, there is a threshold for the force applied to the line, below which the line remains "stuck" to the surface and does not move. For most surfaces, this threshold is very high and even in the case of achiral nematics the energy difference between the two textures is insufficient to exceed this threshold. Thanks to the lines of defects "sticking", an infinite bistability is obtained for arbitrary grey scale states.

The energy per unit length of the two lines of defects is very different (FIG. 5). The surface walls have a lower total volume distortion energy and a zero core energy (they do not have a molten core and in the wall the nematic order is not greatly disturbed). In contrast, they have a strong anchoring energy contribution due to the disorientation of the surface director in the wall with respect to the easy axis imposed by the alignment layer. In general, the total energy is lower in the case of surface walls, thereby favouring the transformation of the disclination lines into the surface walls. For this transformation to take place, it is necessary to bring the core of the line close to the surface (the core "passes through" the surface and becomes a virtual core). FIG. 5 shows schematically the energy of the volume line V as a function of its distance z from the surface. A high anchoring energy barrier (B) separates the S state (surface wall) from the V state (volume line) and prevents the disclination line from coming sufficiently close to the surface. Because of this barrier, in the absence of an electric field the volume lines V remain in the middle of the cell, without being transformed into surface walls.

After the anchoring has been broken, when a hybrid texture forms, the two types of structure of the defect lines are present, sometimes even in different regions of the same loop. The highly mobile volume lines therefore move under the action of the line tension force and possibly the force due to a difference in the energies of the two bistable textures (if the chiral pitch deviates from its optimum value). The pixel will therefore relax long term towards another grey scale, different from that imposed by the drive pulse, as only the domains completely surrounded by surface lines will survive.

Figure 6:
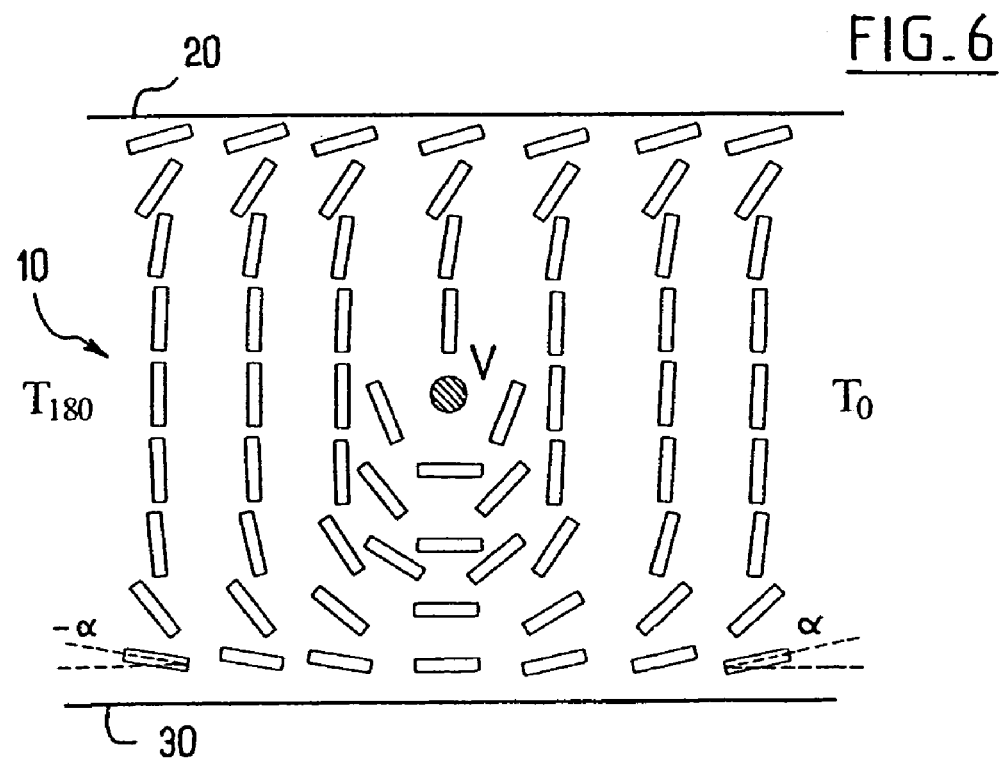
FIG. 6 shows the orientation of the director of the nematic, in a moderate electric field, intermediate between the Fredericks threshold and the break threshold of the anchoring.

To obtain grey scales which are stable long term, it is therefore necessary to "stick" all the disclination lines to the surface by transforming them into 180° reorientation walls. The inventors have discovered that this transformation can be effectively achieved by applying electrical pulses of appropriate voltage and duration. Under a moderate electric field, intermediate between the Fredericks threshold and the anchoring breaking threshold, the director of the nematic orients in the volume parallel to the field, except in the regions close to the two surfaces (FIG. 6). The two main bistable textures transform in a field in different ways: $T_0$ tilts everywhere in the same direction, whereas the "half-turn" texture in torsion $T_{180}$ retains its topological 180° rotation constraint, becoming a "half-turn" in bending. Close to the master plate 20, with strong oblique anchoring, the distortion of the director is uniform. On the slave plate 30, with weak planar anchoring, the surface director is slightly oblique because of the electric torque. However, the two textures have opposite signs (±α). A 2α surface reorientation wall is therefore created opposite the disclination. Between the surface wall and the volume line, the director remains perpendicular to the electric field under the topological constraint and a large amount of electrical energy is stored in this region. To minimize this energy, the line is pushed by the corresponding electric force towards the surface (FIG. 7a). If the electric force is high enough to exceed the energy barrier, the disclination line transforms into a surface wall (FIG. 7b) with a virtual core.

The threshold voltage $U_s$ for the defects to stick, that is to say for the volume disclination lines to be transformed into surface walls, depends on the thickness of the cell, the surface anchoring force, the pulse polarity and the pulse duration τ (because of the friction in the case of the line being transported towards the surface). The typical value of Us is a few volts.

FIG. 8 shows the $U_c(\tau)$ dependence, measured experimentally for a cell according to the present invention of the type described above. This shows that relatively small and short "sticking" signals allow the defect lines to be stabilized and infinite bistability of the hybrid textures to be obtained. These signals may be sent independently of the switching signals, after the relaxation of the broken anchoring, or they may be incorporated into the last part of the drive signals.

ILLUSTRATIVE EXAMPLE

The example below corresponds to a non-limiting example of the device proposed in the present invention, produced and studied by the inventors.

A liquid-crystal cell 10 having a thickness of 1.6 μm was mounted between two glass plates 20, 30 having a thickness of 1.1 mm. These plates 20, 30 were coated with an electrically conductive transparent layer of a mixed indium tin oxide. The master plate 20 received an evaporation of silicon monoxide at an 85° grazing angle. The anchoring of the liquid crystal 10 was thus strong and tilted at about 30° to this master plate 20. The slave plate 30 received an evaporation at a 75° angle of inclination. The anchoring obtained on this slave plate 30 was weak planar anchoring. The liquid crystal used was pentylcyanobiphenyl (5CB) doped with material S811 (from Merck) in order to obtain a 90° spontaneous twist over the thickness of the cell at the temperature of the laboratory. The two states of the cell thus have the same energy.

The inventors have observed, with the aid of a microscope fitted with a conventional image recording device, the behaviour of the domains after switching pulses close to the threshold have been applied.

The curve in FIG. 8 gives the values of "sticking" pulses of the two polarities which allow the domains in this cell to be set. The difference between the two polarities is explained when the local field produced by the surface is taken into account.

The curve in FIG. 9 shows the optical transmission of the cell provided with two polarizers as a function of the amplitude of switching pulses of fixed duration (800 μs). This FIG. 9 shows a white state, for a switching pulse amplitude of less than 10 V, grey states which gradually change from white to black, for switching pulse amplitudes varying between 10 and 14 V, and a black state for switching voltages greater than 14 V. The infinite stability of the grey scales (resulting from the application of switching pulses of amplitude between 10 and 14 V) was obtained by applying, after these switching pulses, a sticking voltage of 5 volts and of the same duration (800 μs). More generally, this switching voltage is between 2 V and 10 V.

Figure 10:
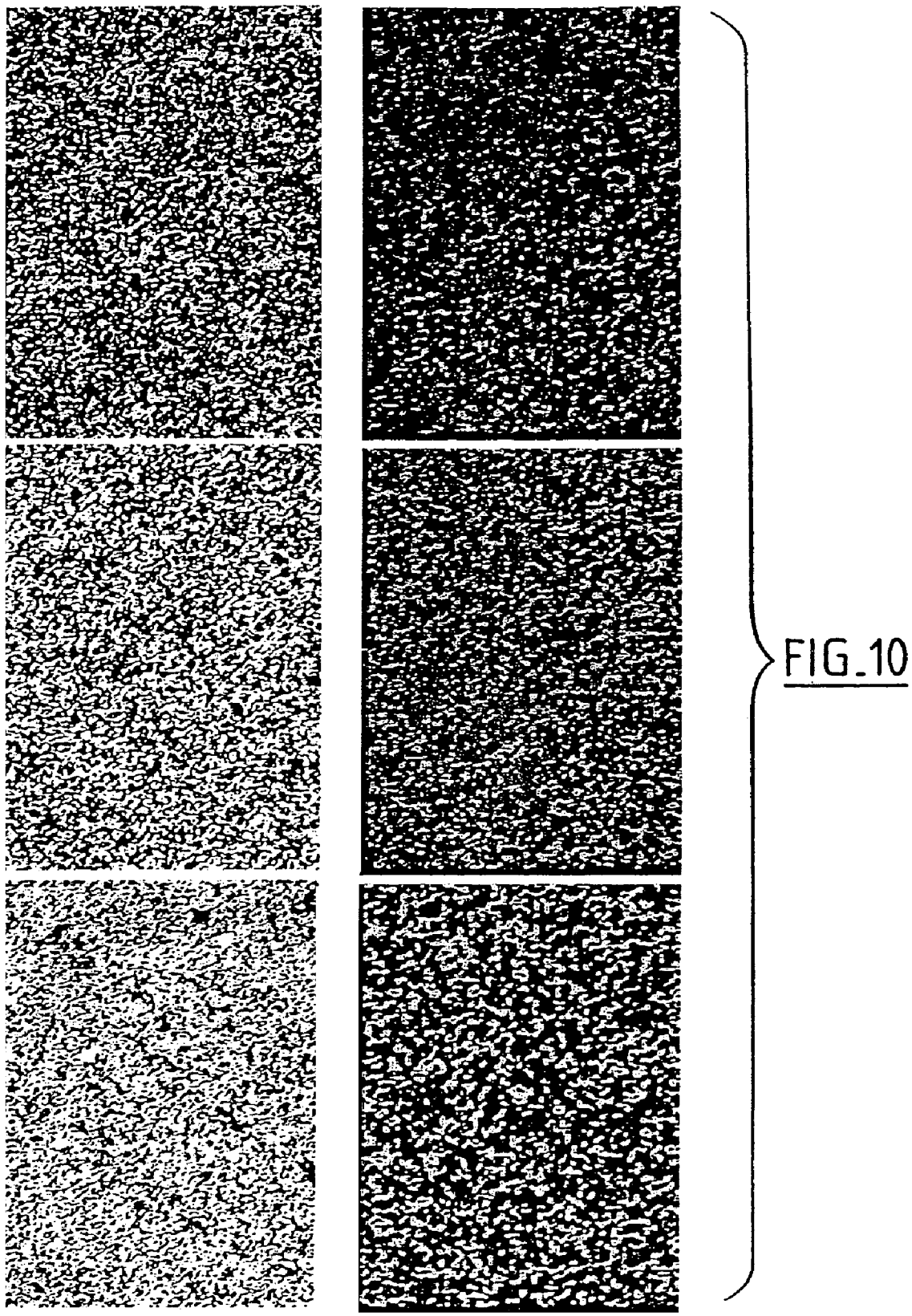
FIG. 10 shows six different grey levels obtained on a cell according to the present invention.

FIG. 10 shows six different grey scales produced in this cell (states L2 to L7 in FIG. 9).

In short, the present invention provides a grey-scale bistable nematic display device. The device uses a known display principle in its general structure, employing two twisted bistable textures of 0° and 180° respectively. The switching is obtained by breaking the anchoring under the action of drive pulses. With signals close to the breaking threshold, a hybrid state is obtained in each pixel, the two bistable textures being respectively produced in microdomains. The ratio of the areas occupied by the two states (and therefore the corresponding grey scale) is controlled by the drive voltage). The grey state of the pixel is maintained without any long-term change by a controlled transformation of the volume disclination lines between the microdomains into surface walls (which are stable to infinity because of the strong rubbing on the surface).

Of course, the present invention is not limited to the particular embodiment that has just been described but extends to all variants in accordance with its spirit.

BIBLIOGRAPHY

[1] "Fast bistable nematic display using monostable surface switching", I. Dozov, M. Nobili, G. Durand, *Appl. Phys. Lett.* 70, 1179 (1997).
[2] WO-A-97 17632.
[3] "Bistable display device based on nematic liquid crystals allowing grey tones", R. Barberi, G. Durand, R. Bartolino, M. Giocondo, I. Dozov, J Li, EP 0773468, U.S. Pat. No. 5,995,173, JP 9274205 (1998).
[4] D. K. Yang, J. L. West, L. C. Chien and J. W. Doane *J. Appl. Phys.* 76, 1331 (1994).

The invention claimed is:

1. A nematic bistable display device comprising:
   a nematic liquid-crystal layer (10) placed between two plates(20, 30) provided with electrodes (22, 32) and with anchoring means (24, 34) which ensure monostable surface anchoring states of the liquid crystal (10) defining two stable textures without electrical field, one texture having the liquid crystal molecules mainly parallel and the other texture having a twist about +/−180° from one plate to the other, along a direction normal to the plates, the symmetry and the force of at least one of the anchoring states allowing the anchoring to be broken in an electric field perpendicular to the plates(20, 30);
   means (40) for applying an electric field to the liquid crystal, between the two plates (20, 30), and for breaking the anchoring to at least one of the surfaces, with a transient passage of the surface director parallel to the field and relaxation after the field has been cut off towards one or other of said two stable textures, which differ from each other by a 180° twist from one plate to the other, along a direction normal to the plates, and are both compatible with monostable anchoring states;
   wherein it furthermore includes:
   control means (40) for producing, after the anchoring has been broken, hybrid textures in which the said two stable textures coexist in a controlled proportion in a pixel, one texture corresponding to a bright state, the other corresponding to a dark state, a grey state value being proportional to the density in each bright and dark states, the said textures being separated by 180° disclination lines in the volume or by 180° reorientation walls on one of the surfaces; and
   means (40) for then applying on the liciuid-crystal layer electric pulses to stick all the 180° disclination lines to the surface by transforming the 180° disclination lines into 180° reorientation walls, for long-term stabilization of the hybrid textures by immobilization of these 180° reorientation walls on the surface.

2. The device according to claim 1, wherein the liquid crystal (10) is doped so as to be chiral and to correspond to a cholesteric.

3. The device according to claim 1 or claim 2, wherein the control means (40) are designed to apply to the liquid crystal an electric field close to the threshold for breaking the anchoring of the liquid crystal to at least one of the surfaces.

4. The device according to claim 1, wherein the control means (40) comprise at least one alignment layer, the surface of which is periodically or randomly corrugated.

5. The device according to claim 1, wherein the control means (40) comprise means capable of defining a dispersion in the anchoring force on at least one of the surfaces.

6. The device according to claim 5, wherein the control means (40) comprise non-uniform alignment layers.

7. The device according to claim 5, wherein the control means (40) are suitable for applying a uniform electric drive field.

8. The device according to claim 1, wherein the control means comprise means (40) capable of applying slightly non-uniform electric fields to a pixel.

9. The device according to claim 8, wherein the control means (40) comprise electrodes (22, 32) the resistance or the surface finish of which is not uniform.

10. The device according to claim 1, wherein the control means comprise means (40) capable of causing, during a drive pulse, transient texture instabilities which are of hydrodynamic or flexoelectric origin, or are due to the intrinsic polarity of the surface.

11. The device according to claim 1, wherein the control means comprise means (40) capable of causing, during a drive pulse, transient shear flows of the liquid crystal.

12. The device according to claim 1, wherein the stabilizing means (40) comprise means capable of applying electrical pulses to the liquid crystal, the amplitude of which is between the Fredericks threshold and the anchoring breaking threshold.

13. The device according to claim 1, wherein the stabilizing means (40) comprise means capable of applying electrical pulses to the liquid crystal with an amplitude of a few volts.

14. The device according to claim 1, wherein the stabilizing means (40) comprise means capable of applying electrical pulses to the liquid crystal with an amplitude of between 2 V and 10 V.

15. The device according to claim 1, wherein the stabilizing means (40) comprise means capable of applying electrical pulses to the liquid crystal, independently of switching signals which ensure that the anchoring is broken, after relaxation of the broken anchoring.

16. The device according to claim 1, wherein the stabilizing means (40) comprise means capable of applying electrical pulses to the liquid crystal which are incorporated into the last part of drive signals for ensuring that the anchoring is broken.

17. The device according to claim 1, wherein the control means (40) are designed to apply to the liquid crystal a variable electric field close to the threshold for breaking the liquid-crystal anchoring on at least one of the surfaces, the amplitude of the field being used to control the grey scale obtained.

18. A method employing a nematic bistable display device comprising:
- a nematic liquid crystal layer (10) placed between two plates (20, 30) provided with electrodes (22, 32) and with alignment means (24, 34) which ensure monostable surface anchoring states of the liquid crystal defining two stable textures without electrical field, one texture having the liquid crystal molecules mainly parallel and the other texture having a twist of about +/−180° from one plate to the other, along a direction normal to the plates, the symmetry and the force of at least one of the anchoring states allowing the anchoring to be broken in an electric field perpendicular to the plates; and
- means (40) for applying an electric field to the liquid crystal, between the two plates, and for breaking the anchoring on at least one of the surfaces, with a transient passage of the surface director parallel to the field and relaxation after the field has been broken towards one or other of said two stable textures, which differ from each other by a 180° twist from one plate to the other, along a direction normal to the plates, and are both compatible with monostable anchoring states;

wherein the method comprises the steps of:

producing, after the anchoring has been broken, hybrid textures in which the said two stable textures coexist in a controlled proportion within a pixel, one texture corresponding to a bright state, the other corresponding to a dark state, a grey state value being proportional to the density in each bright and dark states, the said textures being separated by 180° disclination lines in the volume or by 180° reorientation walls on one of the surfaces; and then applying on the liquid-crystal layer electric pulses to stick all the 180° disclination lines to the surface by transforming the 180° disclination lines into 180° reorientation walls, for long-term stabilization of the hybrid textures by immobilization of these 180° reorientation walls on the surface.

19. The method of claim 18, wherein the step of applying stabilizing electric pulses comprises application of electrical pulses the amplitude of which is between the Fredericks threshold and the anchoring breaking threshold.

20. The method of claim 18, wherein the step of applying stabilizing electric pulses comprises application of electrical pulses having an amplitude of a few volts.

21. The method of claim 18, wherein the step of applying stabilizing electric pulses comprises application of electrical pulses having an amplitude between 2 and 10 volts.

22. The method of claim 18, wherein the alignment means comprises local variation of thickness defining non uniform thickness of the liquid-crystal layer.

* * * * *